United States Patent [19]
Smith, Jr. et al.

[11] Patent Number: 5,400,921
[45] Date of Patent: Mar. 28, 1995

[54] POWDERED LUBRICANT APPLICATOR

[75] Inventors: Jack D. Smith, Jr., Brighton; Edward M. McCarthy; Peter M. Neu, both of Howell; Robert J. Beach, Oak Grove; Robert C. Curtis, Brighton, all of Mich.

[73] Assignee: Chem-Trend Incorporated, Howell, Mich.

[21] Appl. No.: 124,923

[22] Filed: Sep. 21, 1993

[51] Int. Cl.⁶ .............................................. B67D 5/08
[52] U.S. Cl. ........................................ 222/1; 222/61; 222/334
[58] Field of Search ............... 222/1, 40, 57, 61, 363, 222/359, 360, 334, 636, 642, 643; 406/63, 74

[56] References Cited

U.S. PATENT DOCUMENTS

| | | | |
|---|---|---|---|
| 1,164,286 | 12/1915 | Josephs, Jr. | 406/85 |
| 3,187,401 | 6/1965 | O'Donnell et al. | 222/195 |
| 3,650,436 | 3/1972 | Barber | 222/195 |
| 3,797,709 | 3/1974 | Ivanovich | 222/334 |
| 3,913,795 | 10/1975 | Coucher et al. | 222/381 |
| 4,022,512 | 5/1977 | Autelli | 406/50 |
| 4,108,337 | 8/1978 | Iijima | 222/636 |
| 4,109,027 | 8/1978 | Crose | 427/28 |
| 4,645,095 | 2/1987 | Coppola | 222/40 |
| 4,687,381 | 8/1987 | Dumain et al. | 222/61 |
| 4,687,408 | 8/1987 | Klambauer | 222/636 |
| 4,775,267 | 10/1988 | Yamamoto | 406/50 |
| 4,942,998 | 7/1990 | Horvath et al. | 228/102 |
| 5,033,644 | 7/1991 | Tentler | 222/57 |
| 5,098,229 | 3/1992 | Meier et al. | 406/93 |

*Primary Examiner*—Andres Kashnikow
*Assistant Examiner*—Philippe Derakshani
*Attorney, Agent, or Firm*—McAndrews, Held & Malloy, Ltd.

[57] ABSTRACT

Particulate material delivery apparatus comprising: a measuring device for separating a predetermined quantity of particulate material from a particulate material supply; a first valve which is responsive to a single input signal and which regulates a control fluid and a delivery fluid; an actuator for shifting the measuring device between measuring and delivery positions in response to a pressure signal from the first valve; and a control apparatus for dispensing a pressurized delivery fluid for a variable, predetermined interval of time in response to a pressure signal from the first valve. Also, a method for delivering measured charges of a particulate material, comprising the steps of discharging one charge of the material to a first location, measuring a second charge of the material, and a delivering the first charge to a remote location while measuring the second charge.

19 Claims, 1 Drawing Sheet

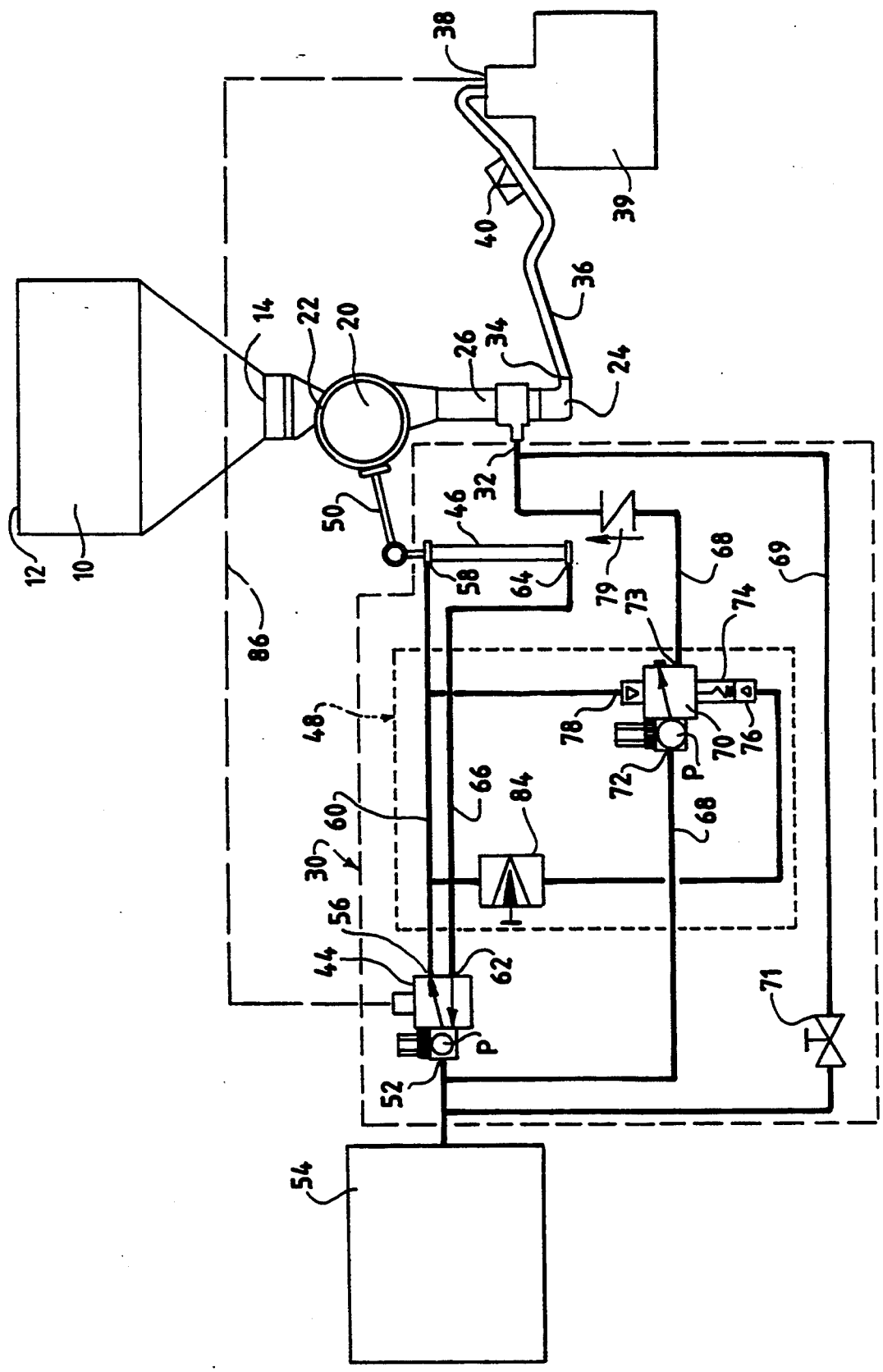

POWDERED LUBRICANT APPLICATOR

BACKGROUND OF THE INVENTION

The present invention relates to apparatus for automatically and uniformly delivering particulate material charges to remote locations. This invention can be used to automatically deliver a solid, powdered lubricant in small, measured quantities to lubricate the plunger or other parts of a die casting machine.

Industrial die casting machines often require automated plunger lubrication. For some applications, solid lubricants are preferred over the standard liquid lubricants. However, solid lubricants typically cannot be delivered with liquid lubricant applicators.

A gravity feed system can be used for delivering solid lubricants. Such a system commonly must be positioned immediately above the lubricant pour hole. Consequently, the flexibility of the system is limited. Also, installation and maintenance of the lubricant supply equipment are difficult due to the necessity of working in close proximity to the die casting equipment.

Systems are known which are capable of conveying air-entrained powders to remote locations in measured amounts. In such systems, both the delivery event and the measuring event often must be separately coordinated with an outside event, such as a mold cycle. Coordination techniques are often complicated, requiring multiple control inputs.

SUMMARY OF THE INVENTION

Accordingly, one object of the invention is a particulate material delivery apparatus which is capable of measuring and delivering specified quantities of particulate material in response to signals received through a single signal path.

Another object of the invention is a particulate material delivery apparatus which can use a single fluid from a common source both as a control fluid and as a delivery fluid.

Still another object of the invention is a particulate material delivery apparatus which can operate remotely from the ultimate delivery location to facilitate maintenance and installation.

Other objects of the invention will become apparent to one of ordinary skill in the art in light of the present specification, drawings, and claims.

One aspect of the present invention meeting one or more of the foregoing objects is a particulate material delivery apparatus comprising a delivery chamber, a measuring device which delivers measured charges of particulate material to the delivery chamber, and a fluid circuit which controls the measuring device and delivers measured charges of particulate material from the delivery chamber to further apparatus, such as delivering a powdered lubricant to a machine requiring lubrication.

The delivery chamber has at least one inlet and at least one outlet. The delivery chamber receives as inputs a delivery fluid supplied by the fluid circuit and a measured quantity of particulate material from the measuring device. The output from the delivery chamber is the particulate material entrained in the delivery fluid.

The particulate material measuring device operates between a first position for measuring a charge of particulate material and a second position for advancing the charge into the delivery chamber via at least one inlet.

The fluid circuit includes: (1) a first valve for selectively passing fluid pressure from at least one inlet to at least one outlet in response to at least one input through at least one signal path; (2) an actuator for shifting the measuring device between measuring and delivery positions in response to a pressure signal from the first valve; and (3) a control apparatus for dispensing a pressurized delivery fluid for a variable, predetermined interval of time, upon activation of an outlet of the first valve, to an inlet of the delivery chamber for conveying a charge of particulate material from the delivery chamber through at least one of its outlets.

BRIEF DESCRIPTION OF THE DRAWING

The FIGURE is a schematic representation of one embodiment of the present invention. In the FIGURE and the following specification, the reference characters are assigned as follows:
10 supply container
12 supply container inlet
14 supply container outlet
20 measuring sleeve
22 measuring sleeve opening
24 delivery chamber
26 delivery chamber particulate material inlet
30 fluid circuit
32 delivery chamber inlet
34 delivery chamber outlet
36 delivery conduit
38 delivery location
39 die casting machine
40 flow detector
44 first valve
46 measuring sleeve actuator
48 control apparatus
50 mechanical linkage
52 inlet of first valve
54 source of pressurized fluid
56 first outlet of first valve
58 first actuator inlet
60 first control fluid conduit
62 second outlet of the first valve
64 second actuator inlet
66 second control fluid conduit
68 primary delivery fluid conduit
69 secondary delivery fluid conduit
70 fluid-piloted valve
71 standard hand valve
72 delivery fluid inlet of fluid-piloted valve
73 delivery fluid outlet of fluid-piloted valve
74 biasing element of actuator
76 first control fluid input of fluid-piloted valve
78 second control fluid input of fluid-piloted valve
79 check valve
80 third control fluid conduit
82 fourth control fluid conduit
84 variable flow regulator valve
86 signal path

DETAILED DESCRIPTION OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the appended claims.

Referring to the FIGURE, a supply of particulate material is provided in a supply container 10. In one embodiment, the particulate material is a powdered, solid lubricant. However, the invention can be used to deliver many other particulate materials. The particulate material enters the supply container from an outside source through a supply container inlet 12 and exits from the supply container 10 through a supply container outlet 14. Alternatively, the supply of particulate material can be replenished by replacing an empty supply container 10 with a full supply container 10.

Particulate material from the supply container outlet 14 enters a measuring sleeve 20 (which can alternatively be another type of container) through a measuring sleeve opening 22. The measuring sleeve 20 is shifted between two positions: a measuring position and a delivery position. In the measuring position (shown in the FIGURE), a measuring sleeve opening 22 is positioned directly beneath a supply container outlet 14. The measuring position is maintained long enough to allow a charge of particulate material to fill the measuring sleeve 20. The measuring sleeve 20 is then rotated, positioning its opening 22 above the delivery chamber particulate material inlet 26, to transfer the particulate material charge into the delivery chamber 24.

A delivery fluid also is supplied to the delivery chamber 24 at predetermined intervals of time from a fluid circuit 30 (indicated with a dashed box) which is described later in this specification. The delivery fluid enters the delivery chamber 24 through a delivery chamber inlet 32. The particulate material charge is entrained in the delivery fluid and carried through a delivery chamber outlet 34 and into a delivery conduit 36. The entrained, particulate material charge then passes through the delivery conduit 36 to the ultimate delivery location 38. In one embodiment, the delivery location 38 is a lubricant pour hole for the plunger of a die casting machine 39. Flow through the delivery conduit 36 is monitored with a flow detector 40 which is adapted to detect and signal abnormal interruptions in the flow.

The fluid circuit 30 comprises a first valve 44, a measuring sleeve actuator 46 for shifting the measuring sleeve 20, and a control apparatus 48 (indicated with a dashed box) for coordinating a measuring sleeve 20 cycle with the input of delivery fluid to the delivery chamber 24.

In one embodiment, the measuring sleeve actuator 46 comprises a fluid cylinder which operates the measuring sleeve 20 through a mechanical linkage 50. To shift the measuring sleeve 20 to the measuring position, the actuator 46 is contracted (as shown in the FIGURE) so that the measuring sleeve 20 is positioned by the mechanical linkage 50 with the measuring sleeve opening 22 beneath the supply container outlet 14. To shift the sleeve 20 to its delivery position, the actuator 46 is extended so that the mechanical linkage 50 positions the measuring sleeve 20 with the measuring sleeve opening 22 above the delivery chamber particulate material inlet 26. The measuring sleeve 20 can be made to have a variable effective volume, such as by inserting objects or baffles which occupy part of the space within the sleeve 20, or mechanically varying the volume of the sleeve 20, or by changing the sleeve 20 for another container of a different size or type.

The measuring sleeve actuator 46 contracts and extends in response to fluid pressure controlled by the first valve 44. In one embodiment, the first valve 44 is a one-inlet, two-outlet solenoid valve. The first valve inlet 52 communicates with a source of pressurized fluid 54. The first outlet 56 of the first valve 44 communicates with a first actuator inlet 58 through a first control fluid conduit 60, and the second outlet 62 of the first valve 44 communicates with a second actuator inlet 64 through a second control fluid conduit 66.

The measuring sleeve 20 is shifted to its measuring position when fluid from the pressurized fluid source 54 is conveyed from the first valve inlet 52 to the first outlet 56, and from there to the first actuator inlet 58. At the same time, fluid from the second actuator inlet 64 and the second control fluid conduit 66 is vented from the second outlet 62 through the first valve 44. The actuator 46 contracts and moves the measuring sleeve 20 into the measuring position through the mechanical linkage 50.

Similarly, the measuring sleeve 20 is shifted to its delivery position by shifting the first valve 44 so fluid from the pressurized fluid source 54 is conveyed from the first valve inlet 52 to the second outlet 62, the second control fluid conduit 66, and the second actuator inlet 64. At the same time, fluid from the actuator inlet 58 and the first control fluid conduit 60 is vented via the first outlet 56.

A control apparatus 48 is used to coordinate the measuring sleeve 20 cycle with the input of delivery fluid into the delivery chamber 24. In one embodiment, the delivery chamber inlet 32 communicates with a source of pressurized fluid 54 through either a primary delivery fluid conduit 68 or a secondary delivery fluid conduit 69. A fluid-piloted valve 70 controls flow through the primary delivery fluid conduit 68. A standard hand valve 71 controls flow through the secondary delivery fluid conduit 69 and is generally closed during normal operation.

The fluid-piloted valve 70 comprises a delivery fluid inlet 72, a delivery fluid outlet 73, a biasing element (for example, a compression spring) 74, a first control fluid input 76, and a second control fluid input 78. The fluid-piloted valve 70 and a check valve 79 are in line with the primary delivery fluid conduit 68. In this embodiment, the biasing element 74 keeps the fluid-piloted valve 70 closed unless counteracted by a net pressure difference between the control fluid inputs 76 and 78.

In one embodiment, the first control fluid input 76 communicates with the first outlet 56 of the first valve through a third control fluid conduit 80, and the second control fluid input 78 communicates with the first outlet 56 through a fourth control fluid conduit 82. A variable flow regulator valve 84 is placed in line with the third conduit 80.

When the first outlet 56 of the first valve is pressurized by operating the first valve 44, that fluid pressure increase is immediately transmitted through the fourth conduit 82 to the second control fluid input 78. That same fluid pressure increase is transmitted more slowly through the flow regulator valve 84 and the third conduit 80 to the first control fluid input 76, but after a predetermined delay the pressure transmitted to the first control fluid input 76 becomes equal to the pressure transmitted to the second control fluid input 78. The duration of the pressure difference is controlled by varying the flow resistance caused by the flow regulator valve 84.

The pressure transmitted to the second control fluid input 78 is initially enough greater than the pressure transmitted to the first control fluid input 76 to counteract the bias of the biasing element 74 and open the fluid-piloted valve 70. After a time delay, the pressure difference between the control fluid inputs 76 and 78 drops sufficiently that the biasing element 74 can again dominate and close the fluid-piloted valve 70. Thus, the measuring sleeve 20 cycle is coordinated with the input of delivery fluid to the delivery chamber 24 in response to a signal received through a single signal path 86 (indicated with a dotted line) into the first valve 44.

A common source of pressurized fluid 54 may provide both the control fluid and the delivery fluid. However, the invention can be adapted to use separate sources of control and delivery fluids. The invention can be further adapted to use different fluids, such as hydraulic fluid and air, as the control and delivery fluids.

In one embodiment, an outside event, e.g. the cycle of a die casting machine 39, is coordinated with the particulate material delivery apparatus through binary signals received by the first valve 44 through a single signal path 86. In response to a first signal, the first valve 44 sends control fluid through the second outlet 62, the second conduit 66, and the second actuator input 64, causing the actuator 46 to extend so that the measuring sleeve 20 discharges a first charge of particulate material into the delivery chamber 24.

In response to a second signal (which may be the discontinuation of the first signal), the first valve 44 sends control fluid through the first outlet 56, the first conduit 60, and the first inlet 58, causing the actuator 46 to contract so that the measuring sleeve 20 moves to the measuring position and receives a second charge of particulate material from the supply container 10. Also in response to the second signal, the first valve 44 pressurizes the control fluid in the third and fourth control fluid conduits 80 and 82. This opens the second valve 70 to transmit the delivery fluid through the primary delivery fluid conduit 68, the delivery chamber 24, and the delivery conduit 36, delivering the charge of powder from the delivery chamber 24 to the die-casting machine 39. When the pressure difference between the control fluid inputs 76 and 78 decays, the delivery fluid flow through the delivery chamber 24 ceases. Alternation of the first and second signals repeats the same cycle.

As described, the method of operation comprises the steps of discharging a first measured charge into a first location such as the delivery chamber 24 responsive to a first signal, measuring a second charge of powdered material in the measuring sleeve 20 responsive to a second signal, and conveying the first charge from the first location to a remote location such as a die casting machine 39 responsive to the same second signal. The conveying of a first particulate material charge occurs between discharging of the first charge and discharging of a second charge, i.e. during the measuring step. Two significant advantages are achieved by practicing the present invention. First, a single binary signal can coordinate the measuring and delivery apparatus with an outside event. Second, the duration of a single measuring and conveying cycle is reduced by conveying a first charge while measuring a second charge.

What is claimed is:

1. A particulate material delivery apparatus comprising:

(a) a delivery chamber having at least one inlet and at least one outlet;

(b) a measuring device operable between a first position for measuring a charge of a particulate material and a second position for advancing the charge into said delivery chamber via at least one inlet of said delivery chamber; and (c) a fluid circuit comprising:

a first valve having a first inlet, a first outlet, and a valve element controllable through at least one input signal path for selectively passing fluid pressure from said first inlet to said first outlet;

an actuator for a receiving a pressurized control fluid from said first outlet of said first valve for shifting said measuring device between said first position and said second position; and control apparatus for dispensing a pressurized delivery fluid for a variable, predetermined interval of time, upon activation of said first outlet of said first valve, to an inlet of said delivery chamber for conveying a charge of particulate material from said delivery chamber through an outlet of said delivery chamber.

2. The particulate material delivery apparatus of claim 1, wherein said delivery chamber is equipped with at least one inlet adapted to receive a delivery fluid and at least one separate inlet adapted to receive particulate matter.

3. The particulate material delivery apparatus of claim 1, wherein at least one outlet of said delivery chamber communicates with a conduit so that particulate matter entrained in the fluid can be conveyed through said conduit.

4. The particulate material delivery apparatus of claim 1, further comprising a flow detector for monitoring the output of said delivery chamber.

5. The particulate material delivery apparatus of claim 4, wherein said flow detector is adapted to detect and signal interruptions in particulate material flow.

6. The particulate material delivery apparatus of claim 1, wherein said measuring device comprises at least one container of variable volume which is moveable between said first and second positions.

7. The particulate material delivery apparatus of claim 1, wherein said first valve is a solenoid valve activated with at least one binary input signal.

8. The particulate material delivery apparatus of claim 1, wherein said first valve has first and second outlets and is a two-position valve having a first position adapted to pressurize said first outlet and bleed said second outlet and a second position adapted to bleed said first outlet and pressurize said second outlet in response to said input signal.

9. The particulate material delivery apparatus of claim 8, wherein said first outlet of said first valve is operatively connected to said measuring device for delivering fluid pressure to shift said measuring device to said first position and said second outlet of said first valve is operatively connected to said measuring device for delivering fluid pressure to shift said measuring device to said second position.

10. The particulate material delivery apparatus of claim 1, wherein said control apparatus comprises a second valve with at least one inlet for a delivery fluid, at least one outlet for the delivery fluid communicating with an inlet of said delivery chamber, and a valve element movable responsive to movement of the valve element of said first valve for periodically opening and closing said second valve.

11. A particulate material delivery apparatus comprising:
(a) a delivery chamber having at least one inlet and at least one outlet;
(b) a measuring device operable between a first position for measuring a charge of a particulate material and a second position for advancing the charge into said delivery chamber via at least one inlet of said delivery chamber, and;
(c) a fluid circuit comprising:
a first valve having a first inlet, a first outlet, and a valve element controllable through at least one input signal path for selectively passing fluid pressure from said first inlet to said first outlet;
an actuator for a receiving a pressurized control fluid from said first outlet of said first valve for shifting said measuring device between said first position and said second position; and
control apparatus for dispensing a pressurized delivery fluid for a variable, predetermined interval of time, upon activation of said first outlet of said first valve, to an inlet of said delivery chamber for conveying a charge of particulate material from said delivery chamber through an outlet of said delivery chamber, wherein said control apparatus comprises a second valve with at least one inlet for a delivery fluid, at least one outlet for the delivery fluid communicating with an inlet of said delivery chamber, and a valve element movable responsive to movement of the valve element of said first valve for periodically opening and closing said second valve, wherein said second valve further comprises a biasing element for normally biasing said second valve closed and a first control fluid input communicating with a first outlet of said first valve for biasing said second valve open when a control fluid from said first outlet of said first valve pressurizes said first control fluid input.

12. The particulate material delivery apparatus of claim 11, wherein said second valve further comprises a second control fluid input communicating with said first outlet of said first valve for biasing said second valve closed when a control fluid from said first outlet of said first valve pressurizes said second control fluid input.

13. The particulate material delivery apparatus of claim 12, further comprising a flow regulator valve or other variable flow restriction disposed between said first outlet of said first valve and said second control fluid inlet, whereby when said first outlet of said first valve is pressurized, said first control fluid input is pressurized before said second control fluid input is pressurized, thereby initially opening said second valve and then closing said second valve after a time delay.

14. The particulate material delivery apparatus of claim 12, further comprising a flow regulator valve or other variable flow restriction for initially establishing a pressure difference between said first and second control fluid inputs to bias said second valve open against the bias of said biasing element, then reducing said difference sufficiently, after a predetermined interval, to allow said biasing element to bias said second valve closed.

15. The particulate material delivery apparatus of claim 10, further comprising a common source of the same fluid communicating with said inlets of said first and second valves.

16. The particulate material delivery apparatus of claim 10, wherein said first valve and said delivery fluid inlet and outlet of said second valve are in parallel.

17. A method of periodically delivering a measured, particulate material charge to a remote location comprising the steps of:
(a) responsive to a first signal received through an input signal path, discharging a first charge of said particulate material to a first location;
(b) responsive to a second signal received through said input signal path, measuring a second charge of said particulate material by separating a predetermined quantity of said particulate material from a supply of said particulate material; and
(c) also responsive to said second signal, conveying said first charge from said first location to said remote location.

18. The method of claim 17, wherein said conveying of said first charge occurs during said measuring of said second charge.

19. The method of claim 17, wherein said conveying of said first charge occurs after said discharging of said first charge and before the discharging of said second charge.

* * * * *